United States Patent [19]

Harwood et al.

[11] 4,054,905

[45] Oct. 18, 1977

[54] AUTOMATIC CHROMINANCE GAIN CONTROL SYSTEM

[75] Inventors: Leopold Albert Harwood, Bridgewater; Erwin Johann Wittmann, North Plainfield, both of N.J.

[73] Assignee: RCA Corporation, New York, N.Y.

[21] Appl. No.: 736,419

[22] Filed: Oct. 28, 1976

[51] Int. Cl.² .......................................... H04N 9/535
[52] U.S. Cl. .................................................. 358/27
[58] Field of Search .................................. 358/27, 40

[56] References Cited

U.S. PATENT DOCUMENTS

| | | | |
|---|---|---|---|
| 3,740,462 | 6/1973 | Harwood | 358/27 |
| 3,967,313 | 6/1976 | Miyamoto | 358/27 |

*Primary Examiner*—Richard Murray
*Assistant Examiner*—Mitchell Saffian
*Attorney, Agent, or Firm*—Eugene M. Whitacre; Kenneth R. Schaefer

[57] ABSTRACT

An automatic gain controlled chrominance signal amplifier system for a color television receiver is arranged to process composite chrominance signals having burst and image-representative components. First, second and third amplifier stages are provided for amplifying the image-representative components. The first amplifier also amplifies burst components and is gain controlled in a first closed loop arrangement to maintain a substantially constant amplitude for the burst component and to thereby maintain an appropriate gain for image components. The second and third amplifiers are coupled to the output of the first amplifier. The output of the second amplifier is coupled to a chrominance signal overload detector arranged to respond to image-representative signal components having peak amplitudes greater than a predetermined level. A gain control output provided by the overload detector is coupled to each of the second and third amplifiers to vary their gains in a manner to prevent undesired oversaturation of the displayed image. A further gain control adjustment (e.g., viewer operated) is coupled to the third amplifier but not to the first or second amplifiers. Apparatus is also provided for shifting the operating threshold of the overload detector.

8 Claims, 1 Drawing Figure

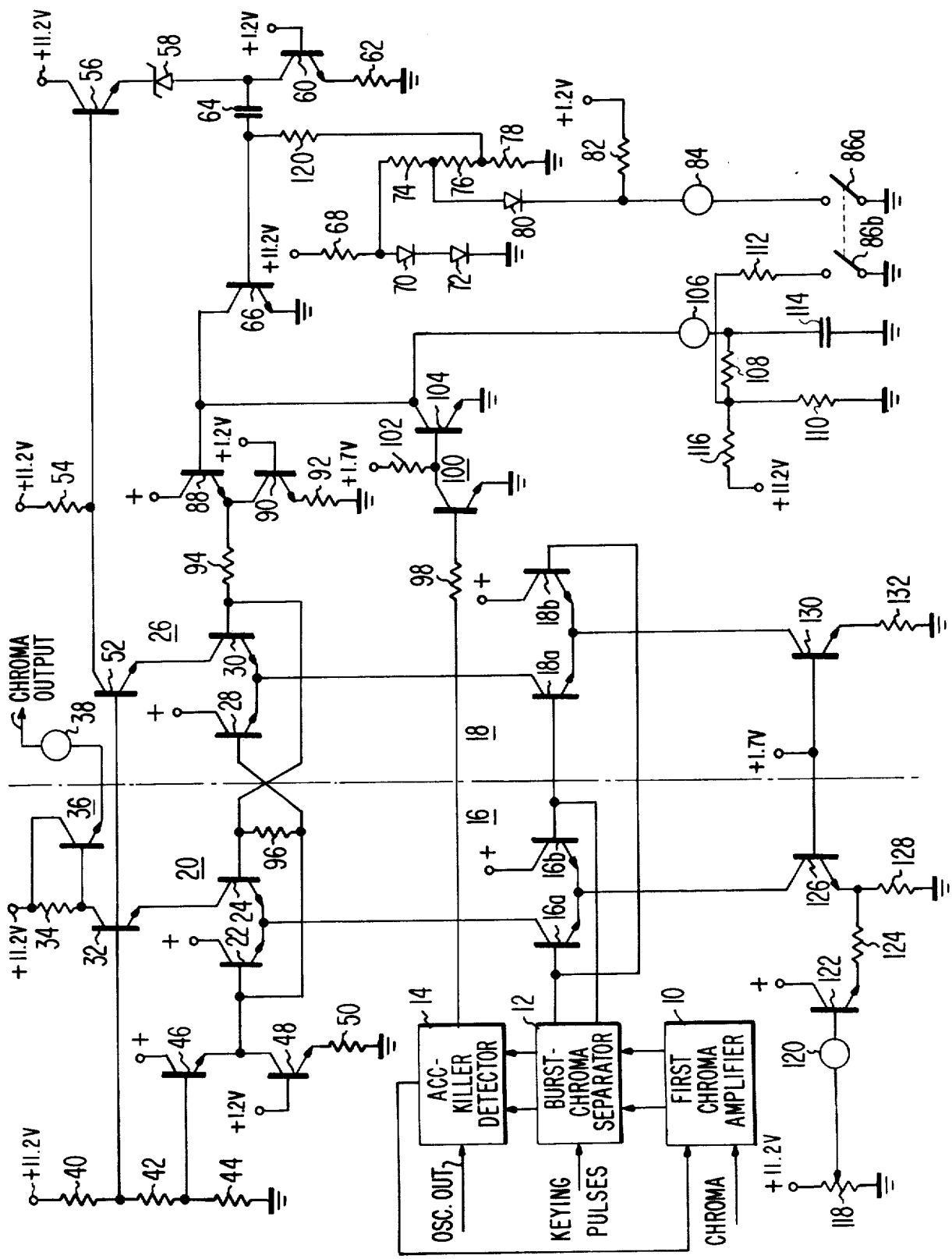

AUTOMATIC CHROMINANCE GAIN CONTROL SYSTEM

This invention relates to color television systems and, in particular, to apparatus for providing improved gain control of color (chroma) signal processing circuits.

A particularly advantageous gain control arrangement for color signal processing circuits is described in U.S. Pat. No. 3,740,462 granted June 19, 1973 to Leopold Albert Harwood. In that apparatus, the gain of a first chrominance signal amplifier is controlled by a closed loop automatic chrominance control (ACC) system employing a noise immune, synchronous detector responsive to the amplitude of color burst information. The gain of a second chrominance signal amplifier is controlled by a second closed loop "chrominance overload" detector which is responsive to the peak amplitude of picture interval chrominance signals supplied by the second chrominance amplifier. The resultant two loop chrominance gain control arrangement provides improved performance (as compared to a single loop ACC system), particularly when noisy or weak signals are being processed. The Harwood arrangement also includes a manual (viewer operated) control for varying the gain of the second chrominance amplifier.

In that system, the manual control is ineffective to increase chrominance signal levels beyond the limit set by the characteristics of the overload correction circuit. That is, when the peak amplitude of the processed chrominance signals is equal to the signal limit which causes the overload detector to reduce the gain of the second amplifier, any further adjustment of the color control in a direction to increase saturation of the displayed color image components will be counteracted by the automatic system and thus will have no effect on the degree of saturation of colors in the displayed image. This result may be desirable under certain conditions (particularly noisy signal reception). However, in many practical applications, because of component tolerances, the operating threshold of the overload detector may be expected to differ from an optimum design value. When this tolerance factor is taken into consideration in the circuit design, the nominal detector threshold level is actually set somewhat below an optimum (high) saturation level. In any particular receiver, therefore, the range of color saturation control available to a viewer may be less than the optimum maximum range suitable for processing of normal signal levels.

In accordance with the present invention, an automatic gain controlled chrominance signal amplifier system for processing composite chrominance signals having burst and image-representative components comprises a first amplifier, having at least one input terminal adapted for coupling to a source of composite chrominance signals, for providing amplified image-representative components at a first output terminal. A second amplifier is provided having at least one signal input terminal coupled to the first output terminal of the first amplifier, having at least one control terminal adapted to receive a first gain control signal and having at least a first output terminal at which gain controlled image-representative chrominance signal components are provided. A third amplifier is provided having at least one signal input terminal coupled to the first output terminal of the first amplifier, having at least one control terminal adapted to receive a first gain control signal and having at least a first output terminal at which gain controlled image-representative chrominance signal components are provided. Detector means are provided having an input terminal coupled to the first output terminal of the second amplifier and responsive to peak excursions of the gain controlled image-representative chrominance signal components for coupling the first gain control signal to the one control terminal of each of the second and third amplifiers. A further signal gain controlling means is associated with the third amplifier for adjusting the amplitude of chrominance signal components at the first output terminal thereof without affecting the gains of the first or second amplifiers.

Referring to the drawing, a portion of the chrominance (chroma) signal processing circuits of a color television receiver embodying the invention is shown. The major portion of the illustrated circuit elements is suitable for construction on a single integrated circuit chip, as will become apparent from the following description.

Composite chrominance signals, including sequential synchronizing burst portions and image-representative chrominance signal portions, are supplied to a first gain controllable chroma amplifier 10 which may, for example, be of the type illustrated by the first chrominance signal amplifier of the above-identified Harwood patent. Amplified push-pull composite chrominance signals are supplied by amplifier 10 to a burst-chroma separator circuit 12 which is also supplied from a horizontal line scanning generator (not shown) with keying pulses in time coincidence with the burst interval. The separated burst information is compared in an ACC-killer detector 14 with the output of an associated color reference oscillator (not shown) to provide ACC information to first chroma amplifier 10 in the manner described in the Harwood patent. ACC-killer detector 14 itself may be of the type shown in U.S. Pat. No. 3,740,461 granted June 19, 1973, to Leopold Albert Harwood.

Push-pull chrominance signals are coupled during the image interval of each line scanning period from burst-chroma separator 12 to similar second and third chrominance signal amplifiers 18 and 16. Amplifiers 16 and 18 are each arranged in differential configurations and comprise, respectively, transistors 16a, 16b and transistors 18a, 18b. Amplified chrominance signal components are coupled from amplifier 16 to a further differential amplifier 20 arranged as a chrominance signal current splitter or current steering circuit comprising transistors 22 and 24. The output signal current of transistor 16a is steered through the collector-emitter paths of transistors 22 and 24 of amplifier 20 according to the difference between the direct voltages supplied to the bases of transistors 22 and 24. The base of transistor 22 is supplied with a relatively fixed direct reference voltage (e.g., 6.3 volts) provided by a resistive divider comprising resistors 40, 42, 44, coupled across a direct voltage supply (+11.2 volts), a voltage follower transistor 46 and a current sink including a transistor 48 and resistor 50 coupled in the manner shown. The base of transistor 24 is supplied with a direct gain control voltage representative of the peak amplitude of the chrominance signals as will be explained more fully below.

Controlled amplitude chrominance signals are coupled from the collector of transistor 24 via a transistor 32 arranged in a common base configuration to a load resistor 34. Amplified chrominance signals developed across resistor 34 are coupled via an emitter-follower transistor 36 and a terminal 38 to subsequent signal processing stages (e.g., demodulators).

The signal gain associated with the combination of amplifiers 16 and 20 and common base transistor 32 may be varied manually by a viewer by means of an external voltage dividing potentiometer 118 which is coupled across an appropriate positive voltage supply (e.g., +11.2 volts). The wiper of potentiometer 118 is coupled via a terminal 120, a follower transistor 122, and a series resistor 124 to the emitter of a current sink transistor 126 arranged to supply operating current to the joined emitters of transistors 16a and 16b of amplifier 16. The emitter of transistor 126 is returned to a reference voltage (ground) via a resistor 128. The base of transistor 126 is coupled to an appropriate direct bias voltage supply (e.g., +1.7 volts).

In the differential amplifier 18 the emitters of transistors 18a and 18b are joined together and are coupled to an operating current sink comprising a transistor 130 and a resistor 132. While transistor 130 and resistor 132 are arranged similarly to transistor 126 and transistor 128, it should be noted that the current associated with transistor 130 (and therefore the differential amplifier 18 is unaffected by adjustment of the manual chroma gain (saturation or color level) control 118.

The amplified chrominance signal output from differential amplifier 18 is coupled to a current splitter 26 which is substantially identical to and controlled in the same manner as current splitter 20. A common base transistor 52 and load resistor 54 are coupled to the output of current splitter 26. Amplified chrominance signals produced across resistor 54 are coupled via a follower transistor 56, a level shifting zener diode 58, a current sink transistor 60 and a resistor 62, and a coupling capacitor 64 to the base of an overload detector transistor 66. An offset bias voltage is provided at the base of transistor 66 by means of a voltage divider circuit comprising circuit elements 68–78. The offset bias voltage is set by the illustrated combination of diodes 70, 72 and resistors 74, 76 and 78 to a level of 0.5 volts. Chroma signal excursions greater than approximately 0.2 volts above this threshold are required to render detector 66 conductive. In addition, an offset switching circuit is provided for changing the level of chroma signal which must be present before the overload detector transistor 66 operates. This switching circuit comprises a diode 80, a resistor 82 coupled to a bias voltage supply (+1.2 volts) and a switch 86a coupled between ground and a terminal 84 common to one end of resistor 82 and diode 80. Closing the switch 86a changes the offset bias voltage at the base of detector transistor 66 to, for example, 0.3 volts. The level of chrominance signal required to operate detector 66 will then be increased from approximately 0.2 volts to 0.4 volts at the base of detector 66.

A time constant network is coupled via a terminal 106 to the collector of detector transistor 66 and comprises a filter capacitor 114 and resistors 108, 110 and 116. An overload gain control voltage developed across capacitor 114 is coupled to the base of a follower transistor 88, the output of which is coupled to a resistor 94. Resistor 94 is coupled, in turn, to the bases of transistors 24 and 30 associated, respectively, with chroma signal current splitter 20 and chroma overload current splitter 26. A current sink transistor 90 and emitter resistor 92 also are coupled to follower transistor 88. The gains associated with splitters 20 and 26 are controlled according to the applied control signal, as will be explained more fully below.

The base of transistor 88 is also supplied with a color killer control signal from ACC-killer detector 14. The color killer signal is coupled to transistor 88 via a resistor 98, a transistor 100, a resistor 102, a transistor 104, and the time constant network, including capacitor 114, which is coupled to terminal 106. The network including resistors 108, 110, 116 is modified by means of a switch 86b arranged to couple an additional resistor 112 across resistor 110 at the same time that offset setting switch 86a is closed. As is customary, the applied color killer control voltage renders transistors 24 and 30 nonconductive whenever the detected burst information indicates excessively weak or no color is being received.

The operation of the illustrated apparatus will now be described in detail.

The maximum chrominance signal gain for the second chrominance amplifier comprising stages 16, 20 and 32 is determined by selection of the value of load resistor 34, the value of current sink resistor 128 and the value of base bias voltage applied to current sink transistor 126 (+1.7 volts in the illustrated example). The latter two parameters determine the maximum current level in current sink transistor 126. In the illustrated configuration, the current in resistor 128 and hence the maximum current in transistor 126 is selected equal to 2.5 milliamperes. When saturation control 118 is adjusted to provide approximately 1.5 volts or less at terminal 120, follower transistor 122 will be cut off, all of the current in resistor 128 will flow in transistor 126 and the maximum chrominance signal gain condition will be provided by amplifier 16. A minimum or zero chrominance signal gain condition is produced when all of the current in resistor 128 is diverted through transistor 122 and current sink transistor 126 is cut off. This condition occurs in the illustrated configuration when saturation control 118 is adjusted to provide approximately 9 volts or more at terminal 120.

Resistor 132, which is associated with current sink transistor 130 and the overload detector amplifier devices 18, 26 and 52, may be selected equal to or different from resistor 128. In the illustrated arrangement, resistor 132 is of higher resistance value than resistor 128 in order to reduce the operating current level and thereby reduce power dissipation in the overload control circuit. Load resistor 54 is selected to have a greater resistance than resistor 34 in order to provide a desired signal gain in the overload correction loop.

The push-pull chrominance signals supplied by burst-chroma separator 12 are amplified simultaneously by differential amplifier 16 (in the chrominance signal chain) and by differential amplifier 18 (in the overload correction loop). Like portions of the output signal current variations produced at the collectors of transistors 16a and 18a are coupled, respectively, via transistors 24, 32 on the one hand and transistors 30, 52 on the other hand to load resistors 34 and 54.

In normal operation of the overload correction loop (i.e., when switches 86a and 86b are open), the base of detector transistor 66 is supplied with an offset bias voltage of 0.5 volts. Peak chrominance signal excursions less than 0.2 volts at the base of transistor 66 will therefore cause substantially no change in the output of detector 66 (i.e., the voltage at terminal 106). External resistors 116 and 110 are selected to provide, for example, approximately 8 volts (D.C.) at terminal 106 in the absence of conduction by detector transistor 66. This provides a sufficient offset between the bases of transistors 22 and 24 to insure that substantially all of the signal current provided by transistor 16a passes to output load resistor 34 under such conditions. Similarly, substantially all of the signal current of transistor 18a passes via transistors 30 and 52 to resistor 52 under these conditions. When the chrominance signal components coupled to the base of detector transistor 66 have peaks exceeding 0.2 volts, transistor 66 conducts, thereby changing the voltage across filter capacitor 114. In view of the relatively small base control voltage range required to change one side of a differential amplifier from on to off, resistors 94 and 96 provide a voltage divider effect for the control signal produced at the emitter of follower transistor 88. In this manner, the control voltage at terminal 106 is permitted to vary over a range of, for example, 3 volts while the differential base voltages associated with current splitters 20 and 26 vary approximately 0.2 volts.

It should also be noted that, with the illustrated configuration, while overload detector transistor 66 normally responds to peak chrominance signal levels in excess of 0.2 volts (peak-to-peak excursions of 0.4 volts), the corresponding peak signal level at output terminal 38 (when saturation control 118 is adjusted for maximum gain) will be approximately 0.5 volts (one volt peak-to-peak).

Thus, the detector transistor 66 responds to the peak level of the image-representative chrominance signals and develops an appropriate gain control signal to control the gain associated with the combination of circuit elements 18 and 26 (the second amplifier) in a closed loop fashion while, at the same time, controlling the gain associated with the combination of circuit elements 16 and 20 (the third amplifier) in an open loop fashion. Excessive noise (above the preset threshold) accompanying the chrominance signals will also cause the detector 66 to respond and thereby reduce amplifier gain. Consequently, undesired oversaturation of the displayed image by noisy signals will be avoided.

In some conditions of signal reception, the chrominance signals may be relatively free of noise. Provision is made, therefore, by means of switches 86a, 86b to reduce the offset voltage supplied to detector 66 (and thereby increase the peak chrominance signal level required to activate detector 66) and, simultaneously, to reduce the quiescent direct voltage at terminal 106. The latter change reduces the offset between the base voltages supplied to current splitters 20, 26 and thereby reduces the signal voltage "delay" associated with changing the gains of the second and third amplifiers.

In particular, when switches 86a and 86b are placed in the closed position, the offset voltage supplied to the base of detector transistor 66 is reduced to a fraction of the voltage across diode 80, as determined by the values of resistors 76 and 78. In the case shown, this offset voltage is reduced to 0.3 volts. The peak signal swing required to activate detector transistor 66 therefore is increased to 0.4 volts. A consequent doubling in maximum available chrominance signals at terminal 38 will also be produced.

The reduction in voltage delay associated with the closing of switch 86b is accomplished by the coupling of resistor 112 across resistor 110 to reduce the quiescent voltage at terminal 106.

While the invention has been described in terms of a preferred embodiment, various modifications may be made within the scope of the invention. For example, the network 108-116 need not be shared with the killer detector. Rather, a separate arrangement, having a time constant different from that associated with the killer, may be used. Similarly, different amplifier, manual gain control and burst-responsive automatic chroma control circuits may be employed. Other modifications may also be made.

In a particular arrangement constructed according to the invention, wherein voltages and currents corresponding to those noted in the preceeding explanation existed, the following values for circuit elements were employed.

| Resistor | 34 | 2,200 ohms |
| --- | --- | --- |
| Resistor | 40 | 7,400 ohms |
| Resistor | 42 | 1,000 ohms |
| Resistor | 44 | 14,000 ohms |
| Resistor | 50 | 800 ohms |
| Resistor | 54 | 4,000 ohms |
| Resistor | 62 | 5,000 ohms |
| Resistor | 68 | 9,800 ohms |
| Resistor | 74 | 8,000 ohms |
| Resistor | 76 | 28,000 ohms |
| Resistor | 78 | 20,000 ohms |
| Resistor | 82 | 3,000 ohms |
| Resistor | 92 | 1,000 ohms |
| Resistor | 94 | 6,200 ohms |
| Resistor | 96 | 400 ohms |
| Resistor | 98 | 5,000 ohms |
| Resistor | 102 | 10,000 ohms |
| Resistor | 108 | 27,000 ohms |
| Resistor | 110 | 8,200 ohms |
| Resistor | 112 | 22,000 ohms |
| Resistor | 116 | 3,000 ohms |
| Resistor | 118 | 10,000 ohms (variable) |
| Resistor | 120 | 40,000 ohms |
| Capacitor | 64 | 10 picofarads |
| Capacitor | 114 | 1 microfarad |

What is claimed is:

1. In a color television receiver, an automatic gain controlled chrominance signal amplifier system for processing composite chrominance signals having burst and image-representative components comprising:

a first amplifier having at least one input terminal adapted for coupling to a source of composite chrominance signals for providing amplified image-representative components at a first output terminal;

a second amplifier having at least one signal input terminal coupled to said first output terminal of said first amplifier, having at least one control terminal adapted to receive a first gain control signal and having at least a first output terminal at which gain controlled image-representative chrominance signal components are provided;

a third amplifier having at least one signal input terminal coupled to said first output terminal of said first amplifier, having at least one control terminal adapted to receive a first gain control signal and having at least a first output terminal at which gain controlled image-representative chrominance signal components are provided;

detector means having an input terminal coupled to said first output terminal of said second amplifier and responsive to peak excursions of said gain controlled image-representative chrominance signal components for coupling said first gain control signal to said one control terminal of each of said second and third amplifiers; and further signal gain controlling means associated with said third amplifier for adjusting the amplitude of chrominance signal components at said first output terminal thereof without affecting the gains of said first and second amplifiers.

2. An amplifier system according to claim 1, wherein: said further gain controlling means comprises a viewer-operative color saturation control for varying the gain of said third amplifier only.

3. An amplifier system according to claim 1, wherein: said second and third amplifiers are of similar circuit configuration, said signal input terminals of said second and third amplifiers are coupled in common to said first amplifier, said control terminals are coupled in common to said detector means and said second and third amplifiers are similarly responsive to said first gain control signal for proportionally varying the amplitude of chrominance signals produced at their respective output terminals.

4. An amplifier system according to claim 1, wherein: each of said second and third amplifiers comprises a load circuit and a current splitter for controllably conducting signal currents to said load circuit in response to said first gain control signal.

5. An amplifier system according to claim 1, wherein: said amplifier system further comprises burst detecting means coupled to said output terminal of said first amplifier for detecting variations of the amplitude of said burst component with respect to a reference level and for providing a second gain control signal;

said first amplifier further comprising a gain control terminal coupled to said burst detecting means and responsive to said second gain control signal for maintaining the amplitude of said burst component at said predetermined level; and said further gain controlling means comprises a viewer-operative color saturation control for varying the gain of said third amplifier only.

6. An amplifier system according to claim 5, wherein: said input terminals of said second and third amplifiers are coupled in common to said output terminal of said first amplifier; and said control terminals of said second and third amplifiers are coupled in common to said peak excursion detector means.

7. An amplifier system according to claim 6, wherein: said peak excursion detecting means comprises offset biasing means for maintaining said last-named detecting means unresponsive to chrominance signal components less than a predetermined amplitude and for providing said first gain control signal to each of said second and third amplifiers to maintain predetermined maximum peak excursions of said chrominance signals at said output terminals of said second and third amplifiers.

8. An amplifier system according to claim 7, wherein: said offset biasing means comprises first and second bias supplies and switching means for selectably coupling one of said bias supplies to said peak excursion detecting means and thereby alter said maximum peak excursions at said output terminals of at least said third amplifier.

* * * * *